United States Patent

[11] 3,612,356

| [72] | Inventor | James B. McVey<br>Hill City, S. Dak. |
|---|---|---|
| [21] | Appl. No. | 811,918 |
| [22] | Filed | Apr. 1, 1969 |
| [45] | Patented | Oct. 12, 1971 |

[54] APPARATUS FOR SPRAYING TURF AND THE LIKE
10 Claims, 1 Drawing Fig.

[52] U.S. Cl. .................................................. 222/145,
222/176, 222/178, 239/142, 239/172, 239/310
[51] Int. Cl. ........................................................ B67d 5/22
[50] Field of Search............................................. 239/142,
143, 148, 172, 199, 304, 310; 222/70, 145, 176, 178

[56] References Cited
UNITED STATES PATENTS

| 1,909,733 | 5/1933 | Thwaits ........................ | 222/145 |
| 2,670,104 | 2/1954 | Freeman et al. ............... | 222/145 |
| 2,760,820 | 8/1956 | Cirese .......................... | 239/310 X |
| 3,025,006 | 3/1962 | Maurath........................ | 239/142 X |
| 3,101,902 | 8/1963 | Chamberlain et al......... | 239/310 X |
| 3,322,350 | 5/1967 | Heinicke et al............... | 239/172 |

*Primary Examiner*—Lloyd L. King
*Attorney*—Kenyon & Kenyon Reilly Carr & Chapin ABSTRACT: The disclosure relates to a method and apparatus for spraying a predetermined mixture of liquid chemicals onto turf and the like. A small size panel truck is provided with a plurality of containers for housing liquid chemicals, a means for automatically mixing the chemicals in accordance with a predetermined selection, means for connecting an external water supply to the vehicle, and means for introducing chemicals into the water which is then ultimately applied to the turf or the like.

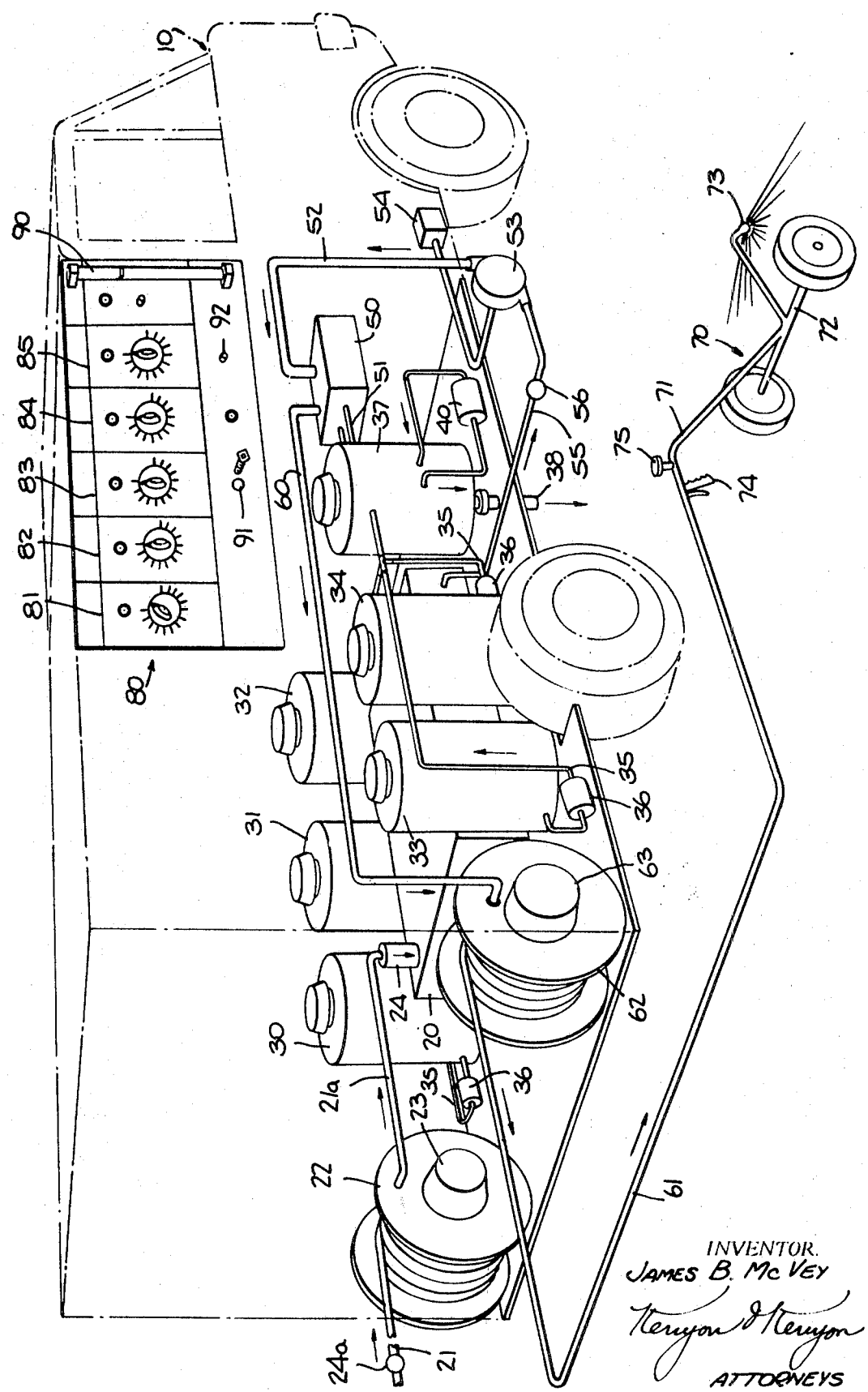

APPARATUS FOR SPRAYING TURF AND THE LIKE

BACKGROUND OF THE INVENTION

This invention relates generally to a method and apparatus for spraying turf and the like, and more particularly, to one wherein liquid chemicals are sprayed thereon.

Turf, shrubs, and other plants generally require the application of fertilizers and different disease controllers in order to sustain the desired appearance and growth. A variety of different applicators have been proposed in the past. Generally, the applicators provide for direct application of a granular material to the turf or plant being treated. This is particularly true in the case of the normal home lawn. Application of granular materials presents several drawbacks when contrasted to the direct application of a liquid material. Firstly, the granular material must be converted to a liquid form in order for the plant to be capable of accepting it into its root system. This necessitates an additional watering operation after application of the granular material. Secondly, the granular materials are considerably more expensive than the equivalent liquid chemicals, sometimes exceeding the cost of the liquid by more than five times. These drawbacks are further compounded by the fact that some of the chemicals are originally produced in a liquid form, then converted to a granular form so that they may be applied to the plant, and then must be reconverted back into a liquid for the plant to accept the chemical.

Numerous devices exist in the prior art for applying chemicals to plants, the more common of which are directed to means for applying granular materials. More recently, it has been proposed to directly apply the liquids to the plants from a vehicle. When services are provided to the normal type of home lawn, industrial site, or golf course, these liquid applicating vehicles have been of an unduly large size and present problems because of their excessive weight. This excessive weight is the direct result of the large amount of water carried in the vehicle and used in conjunction with the application of the chemicals. Further, these vehicles have been limited in that they are provided with means for carrying only one type of chemical. Particularly when dealing with turf, several types of different chemicals should be applied during various times of the growing season. For instance, different weed controllers are necessary during the different seasons of the year. The prior art spraying vehicles require that the vehicle designated to service the particular lawn must often make several trips in order to apply the different types of chemicals necessary. The method and apparatus proposed herein overcomes the deficiencies of the prior art and provides for a small size vehicle capable of servicing any particular lawn with a number of different chemicals determined in accordance with the needs of that lawn.

SUMMARY OF THE INVENTION

A small size panel truck is provided which contains therein a water storage member, a plurality of containers for housing different liquid chemicals, a mixing means for blending the individual chemicals into a substantially uniform mixture, a means for introducing water into the storage member, means for withdrawing the water from the storage member, and a means for introducing the mixed liquid chemicals into the water which is then subsequently applied to the turf or the like. The vehicle is compact in size and does not become unduly heavy because of an excess water supply. In operation, the water is introduced into the vehicle from an external source available at the site of the lawn being treated. This permits the vehicle to be of a sufficiently small size so that local ordinances prohibiting large size vehicles do not become a problem. Further, the vehicle, since it contains facilities for carrying the different chemicals, is adapted to treat any type of lawn in accordance with its particular needs. This latter feature is particularly advantageous since the type of treatment required is generally not determined until the service man inspects the lawn.

Accordingly, it is a primary object of this invention to provide a simple and compact vehicle for treating turf and the like.

It is a further object of this invention to provide means for applying a plurality of liquid chemicals to turf and the like.

It is a still further object of this invention to provide a method and apparatus for applying liquid chemicals to turf and the like in combination with water supplied from a source external to the chemical containing vehicle.

These and other objects, advantages and features of the invention will become more apparent from the following description taken in conjunction with the accompanying drawing.

BRIEF DESCRIPTION OF THE DRAWING

The drawing depicts a schematic type perspective view of a vehicle containing a liquid chemical spraying apparatus.

DESCRIPTION OF THE PREFERRED EMBODIMENT

With reference to the drawing, the chemical spraying apparatus of this invention is contained in a small size panel-type truck indicated at 10. In the rear compartment of the truck 10 is contained a water storage tank 20 which is connected to a hose 21 by means of the tubular conduit 21a. The hose 21, which is mounted on a rotatable cylindrical drum 22, has its free end available to be attached to any convenient water supply. The cylindrical drum 22 is provided with a takeup mechanism 23 which permits automatic retraction of the hose 21 from its extended position. A check valve 24a is provided to insure that the water flow is permitted only in the direction indicated and serves to preclude any backflow of water during the filling of the storage member 20. Storage member 20 also contains a float 24 to stop the water flow when it has been filled. Containers 30, 31, 32, 33 and 34 are provided to house the different liquid chemicals which are to be applied to the lawn. Each of the containers is vented to allow the liquid chemicals housed therein to be readily withdrawn. Each container has connected thereto a tubular conduit 35 which has mounted thereon a small pump 36 for transporting the liquid chemicals into the mixing tank 37. The mixing tank 37 is provided with a drain 38 through which any unused chemicals are readily flushed from the apparatus. A mixing or agitating mechanism is provided for the mixing container 37 by means of a small pump 40 having its inlet end connected to the mixing tank 37 as well as its discharge end. By operation of the pump 40, the liquid chemicals previously introduced into the mixing tank 37 are agitated and mixed by being passed through the pump in the direction of the arrows indicated.

A proportioning device is provided at 50 into which is introduced the previously mixed liquid chemicals from the tank 37 via conduit 51. Also introduced into the proportioning means 50 is a flow of water via the conduit 52. The water is removed from the storage member 20 by the pump 53 which in turn is driven from the vehicle's transmission by means of the power takeoff unit 54. Included on the conduit 55, which connects the pump 53 to storage member 20, is another check valve 56 to insure that no backflow of water is permitted. This is an additional safety measure to insure that the chemicals contained in the vehicle will not backflow through the system into the external water supply. As the pressurized water is passed through the proportioning means 50, it operates a water motor which is internally connected to a piston-type injector pump. The injector pump intermittently injects the liquid chemicals into the water stream and provides a thoroughly mixed chemical and water combination. One of the types of proportioning devices that has been found acceptable is the Smith Precision Co., Newbury Park, Calif. Model R–3, although other types may be substituted.

The combination of water and liquid chemical flows from the proportioning means 50 via the conduit 60 into the hose 61. Hose 61 is again mounted on a rotatable cylindrical drum 62, which has a takeup mechanism 63 for winding the hose onto the drum from its extended position. The hose 61 has its other end connected to a spraying mechanism 70. The spraying mechanism 70 comprises a bent tube 71 which is fixedly attached to a pair of wheels 72. At the free end of the tubular member 71 is a nozzle 73 which is directed toward the terrain or turf under treatment. A valve is provided at 74 which conveniently allows the operator to turn the system on and off. A flow meter at 75 may optionally be provided to provide the operator with information as to the quantity of chemicals applied to the terrain.

A control panel 80 is provided on the exterior of the truck 10. The control panel 80 is divided into five segments 81, 82, 83, 84 and 85. Each of these segments provides a control for the rate of flow from the five different vented containers 30, 31, 32, 33 and 34 containing the liquid chemicals to be applied. For example, each of the containers respectively is illustrated as containing a turf fertilizer, a weed control, a fungus control, a crabgrass control, and a root zone control. In operation, the operator will set the calibrated dials to a preselected number which is in accordance with the amount of liquid chemicals to be applied to the particular lawn. Each of the calibrated dials is an electric timer which when set operates the pump 36 associated with each container for a predetermined amount of time. By means of flow control valves in each of the conduits connecting the vented containers to the mixing tank, operation of the pump for any predetermined amount of time will render a predetermined amount of liquid chemical to be introduced into the mixing tank 37. Appropriate pilot lights are provided to give the operator an indication as to which of the liquid chemicals are being introduced into the mixing tank 37. A liquid sight gauge is provided at 90 so that the operator may readily see the amount of liquid contained in a mixing tank 37 which is ready for application on the lawn. Safety devices are also provided by means of a lock 91 on the exterior control panel 80 so that when the operator is treating the lawn the system may not be changed. A control button 92 for operating the agitating pump 40 is also provided on the exterior control panel so that any additional mixing of the chemicals may be provided.

Operation of the system is illustrated as follows: an operator drives the vehicle to the site of the particular lawn to be treated. In accordance with either the owner's request or upon the operator's inspection of the site, a determination is made as to which chemicals are to be applied to the lawn. The operator will in accordance with this determination set the appropriate control dials on the control panel 80 to the predetermined quantity of chemicals necessary. He will then connect the flexible hose 21 to a water supply available at the site. This may be practically any type of water available. The storage member 20 is thereby provided with additional water to insure that a sufficient quantity is available to dilute the concentration liquid chemicals to be applied to the lawn. The liquid chemicals are pumped into the mixing tank 37 once the mechanism is activated. The operator then by pushing a button on the control panel may sufficiently agitate the chemicals introduced into the mixing tank 37 to provide for a uniform blend. The vehicle is maintained in the operating mode and the pump 53 is driven by the power takeoff unit 54 connected to the vehicle's transmission. The operator then simply removes the spraying means 70 from the vehicle and walks along the terrain to be treated. By activating the valve 74, liquid is applied to the areas across which he walks. By rolling the spraying means across the entire lawn under treatment, he may quickly and completely treat that area with a blend of each of the liquid chemicals necessary to adequately feed the lawn as well as control any disease that may exist in the lawn.

As is readily seen from the foregoing description, the method and apparatus disclosed herein provides for a convenient, simple and inexpensive means for treating any desired lawn. The vehicle is small in size and is flexible in that it may apply any variety of chemicals to the lawn under treatment. Further utilization of the invention described herein may be made in applying chemicals to sidewalks during winter to prevent freezing, in the cleaning of buildings or other similar applications.

Although above description has been directed to a preferred embodiment of the invention, it is expressly understood that other variations and modifications may be made without departing from the spirit and scope thereof.

What is claimed is:

1. An apparatus for applying liquid chemicals to turf and the like comprising in combination means for storing a quantity of water, means for introducing water into said storing means while said apparatus is being utilized to apply liquid chemicals to the turf, a plurality of vented containers for housing liquid chemicals therein, a mixing container coupled to each of said vented containers for mixing liquid chemicals therein, means for introducing the liquid chemicals contained in said vented containers to said mixing container, means for mixing the liquid chemicals in said mixing container, proportioning means coupled to said storing means and said mixing container for blending predetermined amounts of water and mixed liquid chemicals, means for removing the water from said storing means and introducing said water into said proportioning means, and means for applying the water in combination with the liquid chemicals introduced therein to the turf.

2. The apparatus of claim 1, wherein said means for introducing water into said storing means comprises a flexible hose of a length sufficient to connect the machine to a supply of water, a cylindrical member upon which said flexible hose is wound, and means for rotating said cylindrical member so that said flexible hose may be wound thereon.

3. The apparatus of claim 1, wherein said means for applying the water in combination with the liquid chemicals to the turf comprises a flexible hose, a cylindrical member upon which said flexible hose is wound, means for rotating said cylindrical member so that said flexible hose may be wound thereon, and spray means attached to the free end of said flexible hose, 4. The apparatus of claim 3 wherein said spray means comprises a wheeled vehicle, an elongated tubular member attached to said free end of said flexible hose, said elongated tubular member being fixedly attached to said wheeled vehicle and having a nozzle on the open end thereof directed toward the turf.

5. The apparatus of claim 4, which further includes a valve mounted on said elongated tubular member for regulating the amount of fluid flow therethrough.

6. The apparatus of claim 1, wherein said means for introducing the liquid chemicals contained in said vented containers to said mixing container comprises a plurality of tubular conduits interconnecting each of said vented containers with said mixing container, and pumping means interposed in each of said tubular conduits to pump the liquid from each of said vented containers to said mixing container.

7. The apparatus of claim 6 which further includes an adjustable electrical timing means connected to each of said pumping means and a flow control means interposed in each of said tubular conduits thereby providing means for introducing predetermined quantities of said liquid chemicals into said mixing container.

8. The apparatus of claim 1, wherein said means for removing the water from said storing means comprises a tubular conduit interconnecting said storing means with said applying means, and a pumping means interposed in said tubular conduit to pump the liquid from said storing means to said applying means.

9. The apparatus of claim 1, wherein said mixing means comprises a pumping means having an inlet and discharge end, a first tubular conduit connecting said inlet end to said mixing container, and a second tubular conduit connecting said discharge end to said mixing container.

10. The apparatus of claim 1, wherein said proportioning means comprises an injector means for intermittently injecting predetermined quantities of the mixed liquid chemicals into the water.